Dec. 21, 1943.   J. SANCHIS   2,337,276
LIQUID DISPENSING DEVICE
Filed Nov. 10, 1941   2 Sheets-Sheet 1
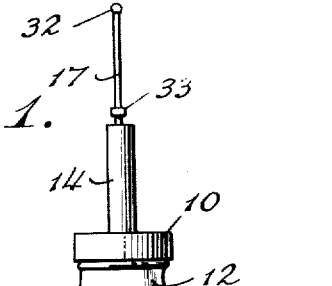
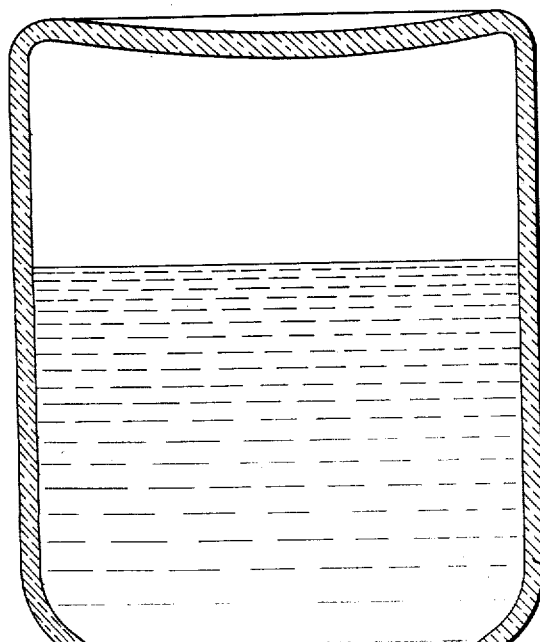
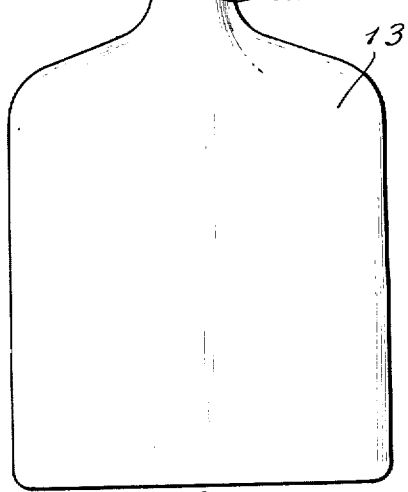
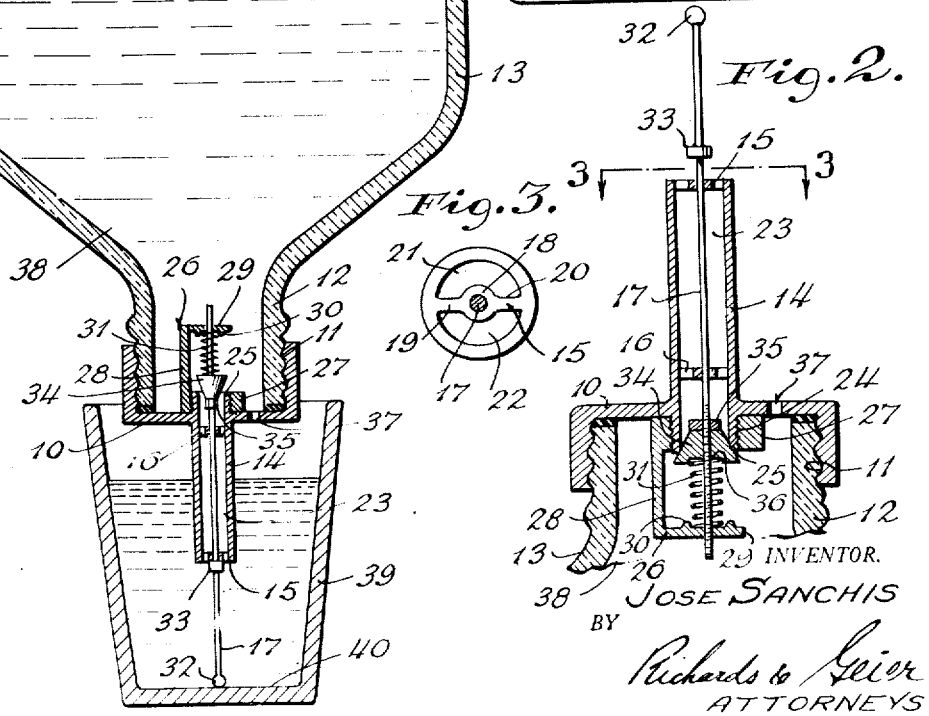
INVENTOR.
JOSE SANCHIS
BY
Richards & Geier
ATTORNEYS Dec. 21, 1943.    J. SANCHIS    2,337,276
LIQUID DISPENSING DEVICE
Filed Nov. 10, 1941    2 Sheets-Sheet 2
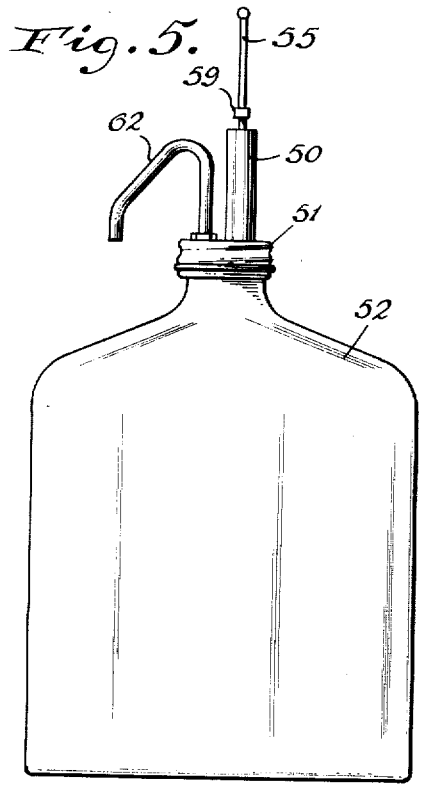
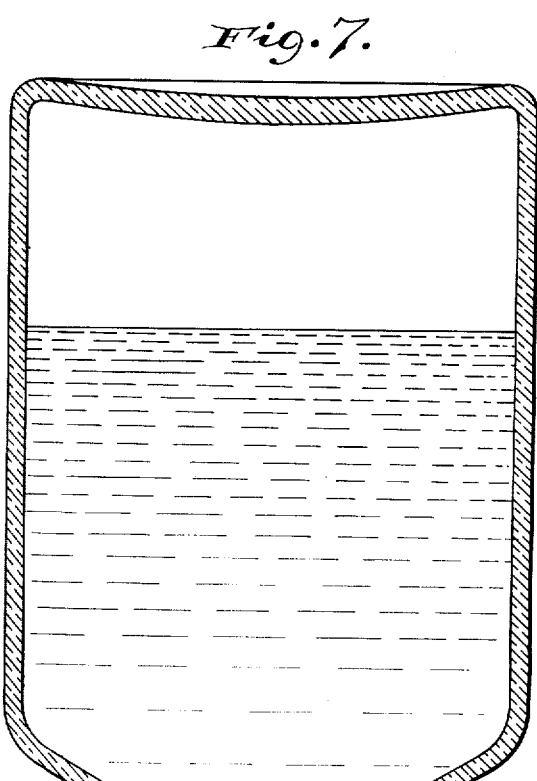
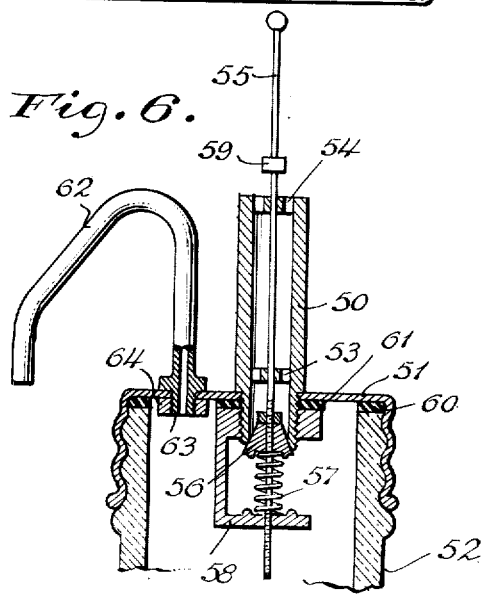
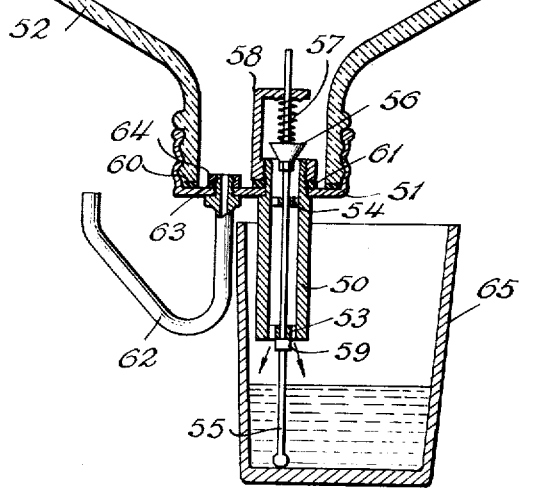
INVENTOR.
JOSE SANCHIS
BY
ATTORNEYS Patented Dec. 21, 1943

2,337,276

UNITED STATES PATENT OFFICE 2,337,276

LIQUID DISPENSING DEVICE

Jose Sanchis, Newark, N. J.

Application November 10, 1941, Serial No. 418,538

5 Claims. (Cl. 221—67)

This invention relates to a liquid dispensing device and refers more particularly to a closure for containers, which is provided with a valve or faucet device automatically delivering uniform quantities of a liquid to receptacles of the same size.

An object of the present invention is the provision of a liquid dispensing device which may be conveniently mounted upon a cap or other closure of a container and which can be easily operated to dispense a certain amount of liquid.

Another object is the provision of a dispenser which may be used in bars, restaurants, laboratories and the like and which may be placed upon bottles or jars for automatically supplying the same amounts of liquid to glasses or other containers of uniform size.

Other objects of the present invention will become apparent from the following specification.

In accomplishing the objects of the present invention it was found desirable to provide a cap or similar closure member with an elongated outwardly extending tube serving as or carrying a guide for a valve rod projecting outwardly beyond the tube and connected with a spring loaded valve body adapted to interrupt the communication between the tube and the interior of the container carrying the closure member.

In operation, the valve rod is pressed against the bottom of a glass or other vessel into which the liquid is to be poured, thereby compressing the spring and raising the valve body from its seat upon the tube. If the container is placed upside down over the glass and if the closure member of the container is provided with an air vent, liquid will flow from the container and into the glass. Actual experiments which I have carried out, show that this flow of liquid will stop after the liquid has reached a certain level in the glass and that the amount of the dispensed liquid is the same whenever a glass of the same size is used.

The invention will appear more clearly from the following detailed description when taken in connection with the accompanying drawings showing, by way of example, preferred embodiments of the inventive idea.

In the drawings:

Figure 1 shows in side elevation a container the cap of which is provided with a dispensing device constructed in accordance with the principles of the present invention.

Figure 2 shows the dispensing device in longitudinal section, on an enlarged scale.

Figure 3 is a transverse section along the line 3—3 of Figure 2, on an enlarged scale.

Figure 4 illustrates the operation of the dispensing device.

Figure 5 shows in side elevation a container the cap of which is provided with a dispensing device of a somewhat different construction.

Figure 6 is a longitudinal section through the dispensing device shown in Figure 5.

Figure 7 illustrates the operation of the dispensing device shown in Figures 5 and 6.

The dispensing device shown in Figures 1 to 4 of the drawings is carried by a cap 10 which is provided with screw threads 11 and which may be screwed upon the neck 12 of a bottle 13.

The cap 10 carries a tube 14 which is firmly connected with the cap or is integral therewith. The tube 14 extends on both sides of the cap 10 and its axis may coincide with the longitudinal axis of the bottle.

The tube 14 has a comparatively long portion which extends outwardly beyond the cap 10 and which is provided with two inner webs 15 and 16 constituting guides for a valve rod 17.

The web 15 is shown in detail in Figure 3 of the drawings and it includes a central sleeve 18 embracing the rod 17 and connected to the tube 14 by web portions 19 and 20. Passages 21 and 22 on opposite sides of the web 15 connect the interior 23 of the tube 14 with the outside space. The web 16 which is situated further inside the tube 14, is of the same shape as the web 15.

That portion of the tube 14 which is situated within the bottle neck 12, is provided with outer screw threads 24 and has conical end surfaces constituting a valve seat 25.

A spring support 26 has a nut or sleeve 27 which is provided with inner screw threads and which is screwed upon the threaded end of the tube 14. A wall or web 28 connects the sleeve 27 with a plate 29 the inner surface of which has an annular ridge 30 enclosing one end of a coiled spring 31. The spring 31 embraces the valve rod 17 which extends through an opening provided in the plate 29.

The inner end of the valve rod 17 extends beyond the support 26. The outer end 32 of the valve rod 17 extends to a comparatively great distance beyond the outer end of the tube 14 and may have the form of a ball. A stop 33 is firmly mounted upon the valve rod 17 between its end 32 and the web 15. As shown in Figures 1 and 2, the stop 33 is situated at a distance from the web 15 when a valve body 34 is seated upon the valve seat 25. Figure 4 shows that the engagement of the stop 33 with the web 15 limits the extent of the inward movement of the rod 17.

The valve body 34 is screwed upon a threaded portion of the rod 17 and is held firmly thereon by a nut 35 screwed upon the rod 17 and engaging the smaller end surface of the conical valve body 34. The opposite surface of the valve body 34 has a recessed portion 36 (Fig. 2) receiving an end of the coiled spring 31.

The cap 10 is provided with a small opening 37 constituting the air vent. The cross-sections of the air vent 37, the liquid-transmitting tube 14 and the length of the rod 17 extending beyond the outer end of the liquid transmitting tube 14 being of such size relatively to each other that the entrance of air through the air vent 37 and hence the dispensing of liquid through the liquid transmitting tube 14 while the valve seat 25 is kept open, ceases when the dispensed liquid reaches a predetermined level relatively to the discharge end 15 of the tube 14.

When no external pressure is exerted upon the rod 17, the valve body 34 is pressed against the seat 25 by the spring 31, so that there is no communication between the interior 38 of the bottle 13 and the interior 23 of the tube 14.

In order to dispense a certain amount of liquid contained in the bottle 13, the bottle 13 is placed upside down over a glass 39 or any other vessel into which liquid is to be poured, and the end 32 of the rod 17 is pressed against the bottom 40 of the glass. This pressure causes the rod 17 to move inwardly, thereby raising the valve body 34 off the valve seat 25 and compressing the spring 31, until the stop 33 strikes the web 15 of the tube 14.

The air vent opens at a point below the minimum level of the liquid in the supply container. Actual experiments which I have carried out show that the flow of liquid from the bottle 13 into the glass 39 will stop as soon as the liquid has reached a certain level in the glass 39 and that the amount of the dispensed liquid is the same whenever a glass 39 of the same size is used. This may be explained by the fact that the water column above the discharge end 15 of the tube 14 balances the water column within the tube 14 and container 13 to such an extent that the friction which the air entering through the vent 37 has to overcome, can no longer be overcome by the buoyancy of the entering air. Consequently, the vacuum built up over the liquid level in the container 13 by the discharge of liquid from the container is no longer equalized by the admission of new air through the air vent. Hence the outside liquid column will balance the inner liquid column. Thus the described dispensing device may be conveniently used in bars, restaurants, laboratories and similar establishments wherein the same amounts of liquid are often dispensed into vessels of uniform size.

The amount of the dispensed liquid may be varied by varying the length of the projecting portion of the rod 17 or the position of the valve body 34 upon the rod.

The dispensing device illustrated in Figures 5 to 7 includes a tube 50 mounted upon a cap 51 which is screwed upon the neck of a bottle 52. Webs 53 and 54 constitute guides for a valve rod 55 carrying a valve body 56. A spring 57 presses the valve body 56 against the inner end of the tube 50 and is engaged by a support 58 which is screwed upon the inner end of the tube 50. The inward movement of the rod 55 is limited by a stop 59.

The cap 51 carries an elastic sealing ring 60 which is interposed between the bottle neck and the cap, while another elastic sealing ring 61 is situated between the cap 51 and the support 58.

In this construction, the air vent is constituted by an elbow tube or U-shaped tube 62 having a threaded end 63 which extends through the cap 51 and which is held in place by a nut 64 screwed upon the tube end 63.

This device operates in the same manner as the one previously described. The elbow pipe 62 is preferably situated outside of the glass 65 while the liquid is being poured, thereby facilitating the dispensing of exact amounts of the liquid.

It is apparent that the specific illustration shown above has been given by way of illustration and not by way of limitation, and that the structures above described are subject to wide variation and modification without departing from the scope or intent of the invention; all of such variations and modifications are to be included within the scope of the present invention.

What is claimed is:

1. A liquid dispensing device, comprising in combination with a closure member for closing a container containing liquid to be dispensed, said closure member having an air vent formed therein an opening into said container below the minimum liquid level in said container, a liquid-transmitting tube carried by said closure member within said opening and extending outwardly beyond said closure member and inwardly within said container, said tube being of substantially the same diameter and devoid of perforations throughout its length and having an inner end located within the container and constituting a valve seat, a movable rod extending through said tube and beyond the inner and outer ends thereof, a valve body firmly mounted upon said rod, and resilient means pressing said valve body against said valve seat, the cross-sections of said air vent and liquid transmitting tube and the length of said rod extending beyond the outer end of said liquid transmitting tube being constructed of a predetermined size to cut off the flow of liquid through said transmitting tube when the dispensed liquid received in a glass within which the outwardly projecting portion of the transmitting tube is placed reaches a predetermined height intermediate the ends of said outwardly projecting portion.

2. A liquid dispensing device, comprising in combination with a closure member for closing a container containing liquid to be dispensed, said closure member having an air vent formed therein an opening into said container below the minimum liquid level in said container, a liquid-transmitting tube carried by said closure member within said opening and extending outwardly beyond said closure member and inwardly within said container, the inner end of said tube constituting a valve seat, a movable rod extending through said tube and beyond the inner and outer ends thereof, at least one rod guide comprising a sleeve enclosing said rod and web portions connected with said sleeve and said tube and maintaining said sleeve within said tube, a valve body firmly mounted upon said rod, and resilient means pressing said valve body against said valve seat, the cross-sections of said air vent and liquid transmitting tube and the length of said rod extending beyond the outer end of said liquid transmitting tube being constructed of a predetermined size to cut off the flow of liquid through said transmitting tube when the dispensed liquid received in a glass within which the outwardly projecting portion of the transmitting tube is placed reaches a predetermined height intermediate the ends of said outwardly projecting portion.

3. A liquid dispensing device, comprising in combination with a closure member for closing a container containing liquid to be dispensed, said closure member having an air vent formed therein an opening into said container below the minimum liquid level in said container, a liquid-transmitting tube carried by said closure member within said opening and extending outwardly beyond said closure member and inwardly within said container, the inner end of said tube constituting a valve seat, a movable rod extending through said tube and beyond the inner and outer ends thereof, a rod guide situated at the outer end of the tube, another rod guide situated within the tube, each of said rod guides comprising a sleeve enclosing said rod and web portions connected with said sleeve and said tube and maintaining said sleeve within said tube; a valve body firmly mounted upon said rod, resilient means pressing said valve body against said valve seat, and a stop firmly mounted upon said rod and adapted to engage the first-mentioned rod guide to limit the inward valve-raising movement of said rod, the cross-sections of said air vent and liquid transmitting tube and the length of said rod extending beyond the outer end of said liquid transmitting tube being constructed of a predetermined size to cut off the flow of liquid through said transmitting tube when the dispensed liquid received in a glass within which the outwardly projecting portion of the transmitting tube is placed reaches a predetermined height intermediate the ends of said outwardly projecting portion.

4. A liquid dispensing device, comprising in combination with a closure member for closing a container containing liquid to be dispensed, said closure member having an air vent formed therein an opening into said container below the minimum liquid level in said container, a liquid-transmitting tube carried by said closure member within said opening and extending outwardly beyond said closure member and inwardly within said container, the inner end of said tube constituting a valve seat, a movable rod extending through said tube and beyond the inner and outer ends thereof, a valve body firmly mounted upon said rod, the inner end of said tube being threaded, a support having a nut-like member screwed upon said inner end of the tube, a plate enclosing said rod and means connecting said nut-like member with said plate; and a coiled spring surrounding said rod and having one end engaging said valve body and another end engaging the plate of said support, the cross-sections of said air vent and liquid transmitting tube and the length of said rod extending beyond the outer end of said liquid transmitting tube being constructed of a predetermined size to cut off the flow of liquid through said transmitting tube when the dispensed liquid received in a glass within which the outwardly projecting portion of the transmitting tube is placed reaches a predetermined height intermediate the ends of said outwardly projecting portion.

5. A liquid dispensing device, comprising in combination with a closure member for closing a container containing liquid to be dispensed and a U-shaped tubular member extending through said closure member and carried thereby, said tubular member constituting an air vent an opening into said container below the minimum liquid level in said container; a liquid-transmitting tube carried by said closure member within said opening and extending outwardly beyond said closure member and inwardly within said container, the inner end of said tube constituting a valve seat, a movable rod extending through said tube and beyond the inner and outer ends thereof, a valve body firmly mounted upon said rod, and resilient means pressing said valve body against said valve seat, the cross-sections of said air vent and liquid transmitting tube and the length of said rod extending beyond the outer end of said liquid transmitting tube being constructed of a predetermined size to cut off the flow of liquid through said transmitting tube when the dispensed liquid received in a glass within which the outwardly projecting portion of the transmitting tube is placed reaches a predetermined height intermediate the ends of said outwardly projecting portion.

JOSE SANCHIS.